United States Patent Office 3,437,437
Patented Apr. 8, 1969

3,437,437
CONTROL OF FOAM FORMATION IN THE
SYNTHESIS OF PHOSPHORIC ACID
George E. Dorwart III, Southampton, Pa., assignor to
Betz Laboratories, Inc., Philadelphia, Pa., a corporation of Pennsylvania
No Drawing. Filed Oct. 5, 1966, Ser. No. 584,383
Int. Cl. C01b 25/22; C07c 91/04
U.S. Cl. 23—165                         14 Claims

ABSTRACT OF THE DISCLOSURE

The present invention concerns anti-foaming compositions and their use in the control of foam during the "wet process" synthesis of phosphoric acid. The invention generally comprises adding to the reaction medium of a phosphate rock and mineral acid a composition comprising the reaction product of between 1 to 4 mols of an acid selected from the group consisting of a saturated fatty acid containing between 4 to 18 carbon atoms and an unsaturated fatty acid containing between 16 to 20 carbon atoms, and 1 mol of a hydroxy amine. The composition is used in an amount of between 0.1 to 5 pounds for every ton of phosphate rock reacted with the mineral acid.

BACKGROUND OF THE INVENTION

In the synthesis of phosphoric acid by the method commonly referred to as the "wet-process," phosphate rock is digested in strong mineral acids to form metal phosphates from which the phosphoric acid is released. In many processes of this type the phosphoric acid obtained is subsequently heated to concentrate the acid. During the entire process, and particularly the digestion and concentration phases, the process is commonly attended by excessive foam formation. As a consequence, the "head" of foam which is formed reduces the capacity of the digestion and concentration chambers or vessels, and may result in overflowing with consequent harm to personnel and equipment. In addition, the foam forms hard deposits upon vessel walls, heating tubes, and the like. While organic matter present in the rock is frequently blamed for the foaming effect, the digestion liquor also contains various inorganic impurities, e.g., the metal carbonates, sulfates, etc., as well as silica and fluorine compounds, which may contribute to, or cause, foaming.

At any rate, foam occurrence requires the use of antifoaming agents both for efficient processing and the protection of personnel and equipment. To date tall oils have constituted the anti-foaming agents primarily used for this purpose.

It is an object of the present invention to provide methods for curtailing the formation of foam during the wet-process synthesis of phosphoric acid.

Another object is the provision of improved agents for the control of foam formation during the wet-process synthesis of phosphoric acid.

A further object is the provision of methods for the preparation of improved anti-foaming agents for use in the control of foam during the wet-process synthesis of phosphoric acid.

Additional objects are provided by the specification and claims.

The objectives of the present invention are achieved by means of an anti-foaming agent comprising the reaction product of an hydroxyl amine and a fatty acid.

The hydroxyl amines employed in the preparation of these reaction products are alkanolamines and hydroxy alkyl substituted alkylene diamines. While diethanolamine reaction products are preferred, reaction products prepared from mono- and tri- ethanolamine are also highly satisfactory. Accordingly, the alkanolamines employed in the preparation of the reaction products used in the practice of the invention may be represented by the general formula $H_{3-y}N(CH_2CH_2OH)_y$, in which $y$ is an integer having a value of between 1 to 3.

Other suitable hydroxyl amine reactants are the hydroxy alkyl alkylene diamines having the general formula:

in which R is a divalent aliphatic hydrocarbon radical containing between 2 to 3 carbon atoms, e.g., an ethyl, propyl or isopropyl radical. Typical of such diamines is N,N-tetra 2 hydroxy propyl ethylene diamine, having the formula:

and the corresponding ethyl compound having the formula:

Consequently, the hydroxyl amine reactants employed in the practice of the invention may be represented by the general formula:

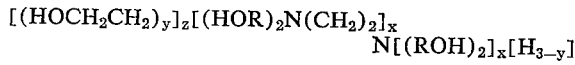

in which R and $y$ have the identities stated above, $x$ and $z$ are integers having a value of between zero to 1, and in which either $x$ or $z$, but never both, is always 1.

The fatty acids employed as reactants in the preparation of the reaction products of the invention comprise saturated fatty acids containing between 4 to 18 carbon atoms in the aliphatic carbon chain, e.g., palmitic, stearic acid, etc., and the unsaturated fatty acids containing between 16 to 20 carbon atoms in the olefinic hydrocarbon chain, e.g., oleic, linoleic, ricinoleic acid, etc. Suitable acidic reactants may be designated by the formula:

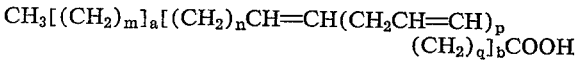

in which $m$ is an integer having a value of between 2 to 16; $n$ and $q$ are integers having a value of between 3 to 10; $a$, $b$ and $p$ are integers having a value of between zero to 1; the sum total of $n$ plus $q$ is between 12 to 16 when $p$ is zero, and between 9 to 13 when $p$ is 1; in which either $a$ or $b$, but never both, is always 1.

Due to the economy which they offer, tall oils or tall oil heads which comprise mixed saturated and unsaturated fatty acids, are preferred as the fatty acid reactants employed in the preparation of the reaction products of the invention. While the specification is primarily concerned with such tall oil compounds, it should be noted that highly satisfactory anti-foam agents have been prepared from pure fatty acids and from blends of such pure acids. The emphasis placed upon the fatty acid compounds results solely from the economy which they provide.

Studies of the nature and anti-foaming efficacy of the various reaction products encompassed by the invention, have indicated that suitable results may be realized with reaction products characterized by ester, amide, or ester and amide groups. For example, in the case of fully and partially reacted triethanolamine reaction products the terminal groups have all been esterified in the one case, but represent an admixture of ester and alkanol groups in the case of the partially esterified products. At the same time, the reaction products of the mono- and di-ethanolamines must necessarily include both esters and amido and/or amine hydrogen substituents. However, despite this diversity of the substituents of the reaction products, satisfactory antifoaming effects have been consistently realized. Similarly in the case of the hydroxy alkyl alkylene diamine reaction products, both full and partial esterification yielded a satisfactory anti-foaming effect. On the basis of control of the esterification, amidification reactions, as evidenced by acid number values, it may be theorized that the reaction products employed by the invention can be represented by the formula:

(I)
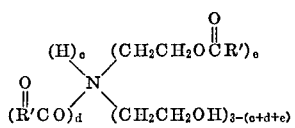

when mono-, di- or tri- ethanolamines are reacted with the saturated and/or unsaturated fatty acids. In the above formula: R' is a fatty acid radical; c and d are integers having a value of between zero to 2; and e is an integer having a value of between 1 to 3.

Similarly, the reaction products of the hydroxy alkyl alkylene diamines may be represented by the formula:

(II)

in which R and R' have the previously assigned identities and $g$ is an integer having a value of between zero to 3.

In the case of the reaction products of Formula I above, an admixture of reaction products may be expected to be obtained when mixed fatty acids, i.e., tall oil or tall oil heads, are employed as the acidic reactant. This will result both from varying degrees of esterification and/or amidification, and from the participation of both saturated and unsaturated fatty acid groups of varying chain lengths in both the esterification or amidification reactions. However, within the prescribed limits, there have been no indications of diminished anti-foaming effects as the result of such deviations or heterogeneity.

The reaction products employed in the practice of the invention are preferably prepared by reacting between 1 to 4 moles of saturated and/or unsaturated fatty acid with each mole of the hydroxyl amine reactant. The lower limit is dictated by the necessity for realizing the desired anti-foaming effect. Specifically, it has been found that if an acid:amine molar ratio of less than 1:1 is employed, the anti-foaming effect of the reaction product is minimal if extant. The upper limit, i.e. 4 moles of acid for each mole of hydroxyl amine, is not a limitation in the strictest sense. Specifically, if the fatty acid reactant is employed in excess of the quantity required for reaction with the available reactive groups of the hydroxyl amine, the excess acid serves as a highly satisfactory diluent for the reaction product without appreciably affecting its anti-foaming effect. Furthermore, when complete esterification and/or amidification of the reactive groups of the hydroxyl amine is the goal of the reaction, a slight excess of fatty acid is preferred.

The course or extent of the reaction may be determined by means of acid numbers. While such values are not directly correlated with amidification, they serve as a good indicator of the degree of esterification achieved, and inversely, as a measurement of the degree of amidification in terms of the sites available for amidification on the particular amine reactant. In the latter regard, there are indications that the amidification reaction is preferential and an acid value indicating a certain degree of esterification could be construed as indicating that at least the same degree of amidification had been achieved.

In regard to the issue of esterification and amidification, there are persuasive but inconclusive indications that a combination of the two reactions is preferred. Specifically, a diethanolamine reaction product, which has the potential for both amido- and ester substituents, performs better than one prepared from triethanolamine when only esterification is feasible. However, to temper this finding, the triethanolamine reaction product is superior to one formed from monoethanolamine which has a high potential in respect to amidification. This could be interpreted as indicating that a diester is preferred but that its efficiency is enhanced when the two ester substituents are combined with an amido group. In any event, the reaction conditions employed are conducive to both esterification and amidification when the hydroxyl amine reactant is susceptible to both reactions, i.e. contains both alkanol groups and amine hydrogen atoms.

Accordingly, it may be seen that the ratio of amine: acid reactants is selected to yield the desired degree of esterification and/or amidification, and the reaction is continued until that degree is realized as evidenced by the acid number of the reaction product. It has been found that the reaction products of the invention may be readily prepared by conventional esterification techniques, including both vacuum and azeotropic methods, and conventional catalysis, e.g., sulfuric acid, may be employed if desired. Diverse methods of preparing these reaction products are set forth by Examples 1 and 2 below:

Example 1

A reaction product was prepared from 227 parts by weight of tall oil heads and 23 parts by weight of diethanolamine (3.3:1 mole ratio). The tall oil heads were first heated to approximately 150° F. and charged to a vacuum reactor. The diethanolamine was then added to the reactor and the admixture was heated rapidly to 400° F. while the pressure was reduced to 23 mm. Hg. The reaction was continued until an acid value of 16 was obtained (theoretical for formation of the diester) at the end of 5 hours. The reaction medium was cooled to 190° F. and removed from the reactor. The tall oil heads employed in the reaction contained 33% by weight of oleic acid, 24% linoleic acid and 25% stearic acid, the remainder of the composition constituting unsaponifiables and less than 1% of rosin acids. This compound possessed a specific gravity of 0.911 (25°/25° C.), a viscosity of 40 (SUS 210° F.), and acid value of 167, a Gardner color of 15, a saponification value of 168, and a flash point of 390° F. (open cup).

Example 2

A reaction product was prepared by an azeotropic technique from 644 parts by weight of tall oil heads, 105 parts by weight of diethanolamine, and 96 parts by weight of a naphthol solvent having a boiling point of 128° C.

The above reactants were charged to a reactor provided with heating means and gradually heated to 200° C. At 130° C. refluxing was initiated and the formed water was removed from the refluxed solvent with the latter being returned to the reactor. The reaction was maintained for 3 hours until an acid value of 0.3 was obtained, and the solvent was then stripped off at 100° C. under a pressure of 28 mm. Hg., to provide 725 parts by weight of reaction product.

Additional examples of suitable fatty acid-hydroxyl amine reaction products are provided by Examples 3–9, below:

Example 3

Triethanolamine and a tall oil heads were reacted in a weight ratio of 13:87 in the presence of a methane sulfonic acid (70% solution) catalyst. The tall oil heads were first preheated to 140° F. and charged to a vacuum reactor. The triethanolamine was then added to the reactor and the mixture was heated to 270° F. with agitation. The methane sulfonic acid was then added, vacuum was applied, and the temperature was elevated until a vacuum of 29 inches Hg and a temperature of 300° F. was achieved. The temperature was maintained for 90 minutes and then elevated to 390° F. for an additional 90 minutes. The reaction product was cooled to 190° F. and the vacuum removed.

The tall oil heads employed in the above reaction contained 80% by weight of mixed fatty acids, possessed an acid value of 167, a Gardner color of 15, a saponification value of 168, a specific gravity (25°/25° C.) of 0.911, a viscosity (SUS, 210° F.) of 40, an open cup flash point of 390° F., and contained 0.5% of rosin acids.

and 20% of unsaponifiable materials. The fatty acids which comprised 80% of the total composition, contained 70% of unsaturated monocarboxylic fatty acids (41% oleic and 29% linoleic). The remaining 30% of saturated fatty acids were palmitic acid and stearic acid.

An analysis of the above reaction product revealed that its contents predominantly comprised the diesters and triesters of the amine, with a limited quantity of the monoester. The balance of the composition, i.e., less than 20%, comprised unreacted fatty acids with slight traces of salts. Due to the presence of mixed fatty acids in the tall oil heads reactant, it is apparent that the esterified amines contain ester substituents of different acids.

Reaction products containing predominantly di-esters may be prepared by a similar reaction in which the alkanolamine content is increased to a mole ratio of 1:2 with the fatty acid reactant. Such a reaction is shown by Example 4 below:

Example 4

The method of Example 3 was repeated with the quantity of triethanolamine increased to yield a 1:2 mole reaction ratio with the molar quantity of fatty acids present in the tall oil heads.

The reaction product derived from this reaction was analyzed and found to consist predominantly of diesters.

Similarly, suitable esters may be prepared by means of the reaction of a dialkanolamine with a fatty acid reactant. Such a reaction is set forth in Example 5 below:

Example 5

One mole of diethanolamine was reacted with two moles of the tall oil heads composition employed in Example 3, by means of the method outlined in Example 3. The reaction product consisted predominantly of the diester of the amine with substitution by both unsaturated and saturated fatty acid residues.

As previously stated, the inventive esters may also be prepared by means of the reaction of the alkanolamines with other sources of fatty acids. Such a synthesis is disclosed by Example 6, below:

Example 6

The method of Example 3 was repeated with the substitution of an equivalent amount of mixed fatty acids derived from tall oil for the tall oil heads employed in Example 3. The tall oil acids employed contained 51% mono-unsaturated oleic acid, 39% nonconjugated diene linoleic acid, 6% conjugated diene linoleic acid, and 4% of stearic acid. This admixture of tall oil acids possessed a Gardner color of 7, an acid number of 190, a viscosity of 0.3 poise (at 25° C.), and were derived by the fractional distallation of tall oil.

The reaction product of Example 6 yielded mixed esters with the di- and tri-esters again predominating, and provided a satisfactory anti-foaming effect as will be subsequently shown.

In addition, though obviously more expensive, the inventive esters may be prepared by reacting a fatty acid or acids as opposed to the mixed fatty acids of tall oil and tall oil heads, with an alkanolamine, as shown by Examples 7–9 below.

Example 7

Triethanolamine was reacted with oleic acid in a 1:3 molar ratio in accordance with the method of Example 3.

Example 8

Example 7 was repeated with the substitution of palmitic acid for the oleic acid.

Example 9

Example 7 was repeated with the replacement of 50% of the oleic acid by palmitic acid.

The reaction products of all of the foregoing examples provided highly satisfactory performances as anti-foam agents, some of which are included in subsequent data. As may be observed, the invention is adaptable in permitting the use of a variety of heterogeneous or substantially homogeneous reaction products prepared from relatively diverse reactants. However, all of the reaction products may be characterized as those formed from the prescribed types of hydroxyl amines and saturated and/or unsaturated fatty acids.

In commercial practice, the foam which is normally experienced during a wet process phosphoric acid synthesis may normally be controlled by means of the addition of between 0.1 to 5 pounds of the fatty acid-hydroxyl amine reaction products, for each ton of phosphate rock which is processed in the synthesis. Variations in the treatment level frequently occur as the result of such factors as deviations in the phosphate and organic content of the rock, the particle size of the rock, the rate at which the process is conducted, the physical arrangement and dimensions of the reactors or digesters employed to process the rock, etc. The inventive anti-foam agents are preferably fed on a continuous basis but periodic treatments are acceptable if the periods between treatments are gauged to the effective life of the anti-foam agent in relation to the foam forming potential of the rock being processed. In addition, the anti-foam agents may be fed to the reactors or digestors, concentrating vessels, or to any other point or plural points at which foaming may be experienced. Such feeding may be accomplished by means of diaphragm or piston metering pumps adjusted to dispense a quantity of anti-foam agent which is commensurate with the rate (weight/time) at which the rock is being processed.

The anti-foam agents of the invention have demonstrated their efficacy in the commercial synthesis of phosphoric acid. In such performance, they have successfully controlled foam formation while requiring a small quantity of anti-foam agent in relation to the quantity of phosphate rock processed without foaming problems. At the same time, the relatively low cost of the inventive anti-foam agents, when combined with the small quantities required for satisfactory foam control, have yielded substantial economic benefits.

The following tests were conducted to precisely demonstrate the efficacy of the present invention in combatting foam formation in wet phosphoric acid syntheses. The anti-foaming effect in such processes is a function of both the quantity (weight) of anti-foam employed and the endurance (time) of the anti-foaming effect. For example, many anti-foaming agents will quickly dispel the foam present in a wet phosphoric acid system. However, the foam may rapidly return and require further addition of the antifoaming agent which entails a high, and often prohibitive, cost for the treatment. Consequently, the following tests have been devised to assess effectiveness of anti-foaming agents in commercial wet-phosphoric acid syntheses. Specifically, phosphate rock is fed in a constant, controlled quantity (by weight) to a constant flow of acid (sulphuric), and the anti-foams tested are added in increments whenever foam commences to reform. Simultaneously, the digestion fluids are withdrawn at a rate commensurate with commercial processing. As a result of the test, the quantity of anti-foam required to effectively inhibit foam formation during the treatment of a given quantity of rock is determined. This determination is expressed both as the parts by weight of anti-foam required to inhibit foam formation during the processing of a million parts by weight of rock, and as the quantity of anti-foam required to inhibit foaming during the processing of one ton of phosphate rock.

To derive these determinations, 69% sulfuric acid was constantly fed at a rate of 80 gms./minute to a reaction tank heated to a temperature of 174° F. and agitated by a stirrer. At the same time, crushed phosphate rock was fed to the reaction tank at a constant rate and the digestion effluent was withdrawn. The rock employed was obtained from the same natural source and had a BPL content of 70–72%. Approximately 0.25 gram of each anti-foam were weighed out and divided into 10 equal increments (0.025 gram). When approximately ½ inch of foam had formed on the furace of the contents of the reaction tank (acid and rock), the first increment of anti-foam agent was added to the reaction mixture, and the time of addition of the anti-foam was noted. When the foam once more began to reform upon the surface, another increment of anti-foam was added, with the time again being noted, and the process was repeated until all of the anti-foam had been utilized. As a consequence, the tests measured the duration of the anti-foaming effect, and since the same total quantity of anti-foam was employed in each instance, and the rate of processing the phosphate rock was constant, the total time of effectiveness of the anti-foam demonstrates both its ability to effectively dispel or control foam formation, and the durability of this effect. For example, if one anti-foam must be added at intervals of 10 minutes, while a second need only be added every 20 minutes, the second is at least twice as effective.

To express this effectiveness, the following formula was employed:

$$\frac{\text{Total weight of anti-foam}}{\text{Total time} \times \text{rock feed rate (weight/time)}} = \text{p.p.m.}$$

In this case, and in all references to these test results, the designation "p.p.m." indicates the parts by weight of the anti-foam which are required to effectively control during the processing on one million parts by weight of the phosphate rock.

In these tests, the anti-foaming agents of the invention were compared with commercially available anti-foams which are widely employed as anti-foams in wet phosphoric acid processes. The composition identified as A is a tall oil consisting primarily of crude oleic acid with added sodium stearate, B is a popular commercially available anti-foam of unknown constituents, and C is a 3:1 admixture of tall oil and mineral oil.

TABLE 1

| Anti-Foam Composition | Parts by Weight of Anti-Foam Required for Control of Foam During Processing of 1,000,000 Parts by Weight of Phosphate Rock | Quantity of Anti-Foam (Pounds) Required for the Processing of One Ton of Phosphate Rock |
|---|---|---|
| A | 396 | .792 |
| B | 390 | .780 |
| C | 467 | .934 |
| Reaction Product of: | | |
| Example 3 | 216 | .432 |
| Example 4 | 222 | .444 |
| Example 6 | 242 | .484 |

On the basis of the above data, it is apparent that the quality of anti-foam required during the processing of a given quantity of phosphate rock can be reduced by as much as 55% through the use of the inventive compositions.

In addition, the cost of anti-foam treatment can be still further reduced by employing the inventive composition in combination with an organic diluent which does not appreciably impair their effectiveness. The feasibility of this benefit is demonstrated by Table 2 below in which the inventive reaction product of Example 3 was combined with 30% by weight of kerosene and subjected to a number of trials with various types of phosphate rock.

TABLE 2

| Trial Number | Parts by Weight of Anti-Foam Required for Control of Foam During Processing of 1,000,000 Parts by Weight of Phosphate Rock | Quantity of Anti-Foam (Pounds) Required for the Processing of One Ton of Phosphate Rock |
|---|---|---|
| 1 | 238 (167) | .476 (.333) |
| 2 | 228 (160) | .456 (.319) |
| 3 | 222 (155) | .445 (.312) |
| 4 | 236 (165) | .472 (.330) |
| Averages | 231 (162) | .462 (.324) |

The figures in parentheses in the above table indicate the actual amount of the inventive esters which are required, without regard for the diluent. Thus it may be seen that the effectiveness of these esters is not diminished when they are combined with an economical organic diluent such as kerosene.

In addition, the effectiveness may be further increased by the addition of a surfactant. For example, the addition of 10% by weight of an alkylaryl polyether alcohol based surfactant (Triton X–100, commercially available from Rohm & Haas Co.) to the reaction product of Example 3 in a quantity of 10% by weight; and to a 70:30 admixture of the reaction product of Example 1 and kerosene, in a quantity of 10% by weight; has yielded the results shown by Table 3 below:

TABLE 3

| Anti-Foam Composition | Parts by Weight of Anti-Foam Required for Control of Foam During Processing of 1,000,000 Parts by Weight of Phosphate Rock | Quantity of Anti-Foam (Pounds) Required for the Processing of One Ton of Phosphate Rock |
|---|---|---|
| I. 10% by weight of surfactant, 90% by weight of reaction product of Example 3 | 188 (169) | .376 (.338) |
| II. 10% by weight of surfactant, 90% by weight of a 30:70 admixture of kerosene and the reaction product of Example 3 | 235 (148) | .470 (.296) |

Again in Table 3, the figures in parentheses relate to the quantity of the anti-foam esters which are present in anti-foam compositions I and II. It is apparent that the quantity of the ester required may be substantially reduced through the addition of surfactants.

In order to demonstrate the general operability of the alkyl alkylene diamines, and the mono-, di- and trialkanolamines, the suitability of vacuum and azeotropic techniques; and the operability of reaction products prepared from admixed hydroxyl amines; a further test series was conducted in conjunction with the reaction products of Examples 10–13 below:

Example 10

The tall oil heads reactant employed in Example 1 was separately reacted with N, N, tetra 2 hydroxy propyl ethylene diamine, and with N, N, tetra ethanol ethylene diamine in mol ratios of 3.3:1 and 4.4:1, respectively, by means of the azeotropic technique of Example 2.

Example 11

Monoethanolamine, diethanolamine and triethanolamine were separately reacted with the tall oil heads reactant employed in Example 1 by means of the azeotropic technique of Example 2. Mol ratios of 1:2 were employed for each reaction.

Example 12

Triethanolamine was reacted with the tall oil heads reactant of Example 6 in a 1:3.3 mol ratio in reactions employing both the vacuum and azeotropic techniques of Examples 1 and 2.

Example 13

The tall oil heads reactant employed in Example 1 was reacted with an admixture of 85% by weight of triethanolamine and 15% of diethanolamine in a 1:3.3 mol ratio (admixed hydroxyl amines: fatty acid), by means of the vacuum technique of Example 1.

The collective results of the testing of the reaction products of Examples 10–13 in respect to their anti-foaming effect, is set forth by Table 4, below:

TABLE 4

| Reaction product | Reactants | Mol Ratio of Reactants (Hydroxylamine: Fatty Acid) | Type of Reaction | Parts Per Million of Anti-Foam Agent Required for Foam Control |
|---|---|---|---|---|
| Example 10: | | | | |
| (a) | N,N tetra 2 hydroxy propyl ethylene diamine and the tall oil heads of Example 1 | 1:3.3 | Azeotropic | 207 |
| (b) | N,N tetra ethanol ethylene diamine and the tall oil heads of Example 1 | 1:4.4 | do | 222 |
| Example 11: | | | | |
| (a) | Monoethanolamine and tall oil heads of Example 1 | 1:2 | Azeotropic | 264 |
| (b) | Diethanolamine and tall oil heads of Example 1 | 1:2 | do | [1] 102 |
| (c) | Triethanolamine and tall oil heads of Example 1 | 1:2 | do | 203 |
| Example 12: | | | | |
| (a) | Triethanolamine and tall oil heads of Example 6 | 1:3.3 | Vacuum | 186 |
| (b) | do | 1:3 | Azeotropic | 220 |
| Example 13 | Admixed triethanolamine and diethanolamine (85:15), and the tall oil heads of Example 1 | 1:3.3 | Vacuum | 138 |

[1] Average of 2 trials.

On the basis of the showing of Table 4, as well as the supporting and ancillary showings in respect to Examples 1–9, it may be observed that efficient anti-foam agents are provided by the invention, and that diverse hydroxyl amines and fatty acids, as well as admixtures of such diverse amines or acids, may be employed in the achievement of the inventive goal. However, suitable reactants are confined to those prescribed by the previous definition of the fatty acid and hydroxyl amine compositions. At the same time, conventional reaction techniques of various types may be employed in the practice of the invention.

While the present specification has dealt predominantly with the anti-foaming effect which may be realized in phosphoric acid wet process syntheses, it should be noted that the anti-foam agents of the invention are generally effective in curbing foam formation in other environments such as pulp and paper mill systems, etc.

It is apparent that the applicant has contributed anti-foaming agents which yield extensive improvements in respect to the control of foam formed during the wet-process synthesis of phosphoric acid, and that such improvements include both an enhancement of the degree of foam control, and substantial reductions in the quantity of anti-foams which are required for this purpose. In addition to reducing the quantity of such agents required, with obvious economic benefits in respect to the cost of these agents and their storage and handling, further economic benefits are made possible through the use of lower cost fatty acid sources, e.g., tall oil and tall oil heads, and economical diluents, e.g., kerosene, which do not appreciably detract from the effectiveness of these agents.

It is also obvious that various alterations, substitutions or modifications may be applied to the invention without departing from the spirit of the invention as defined by the following claims.

I claim:

1. A method for controlling the formation of foam in a phosphate rock and mineral acid reaction medium employed in the synthesis of phosphoric acid, comprising adding to said reaction medium between 0.1 to 5 pounds of the reaction product of between 1 to 4 mols of an acid selected from the group consisting of saturated fatty acids containing between 4 to 18 carbon atoms in the aliphatic carbon chain and unsaturated fatty acids containing between 16 to 20 carbon atoms in the olefinic hydrocarbon chain, and 1 mol of an hydroxyl amine, for each ton of said phosphate rock, and dispersing said reaction product in said reaction medium.

2. A method as claimed by claim 1 in which said acid has the formula $$CH_3[(CH_2)_m]_a[(CH_2)_nCH=CH(CH_2CH=CH)_p(CH_2)_q]_bCOOH$$

in which $m$ is an integer having a value of between 2 to 16, $n$ and $q$ are integers having a value of between 3 to 10, $a$, $b$ and $p$ are integers having a value of between zero to 1, the sum total of $n$ plus $q$ is between 12 to 16 when $p$ is zero and between 9 to 13 when $p$ is 1, in which one of said integers $a$ and $b$, but never both, is always 1.

3. A method as claimed by claim 1 wherein the hydroxyl amine has a formula selected from the group consisting of

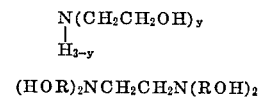

$$N(CH_2CH_2OH)_y$$
$$H_{3-y}$$

$$(HOR)_2NCH_2CH_2N(ROH)_2$$

wherein R is a divalent hydrocarbon containing 2 or 3 carbon atoms and $y$ is an integer of from 1 to 3.

4. A method as claimed by claim 1 in which said acid is an admixture of said saturated and unsaturated fatty acid.

5. A method as claimed by claim 1 in which said acid is oleic acid.

6. A method as claimed by claim 1 in which said acid is linoleic acid.

7. A method as claimed by claim 1 in which said acid is ricinoleic acid.

8. A method as claimed by claim 1 in which said acid is palmitic acid.

9. A method as claimed by claim 1 in which said acid is stearic acid.

10. A method as claimed by claim 1 in which said hydroxyl amine is diethanolamine.

11. A method as claimed by claim 1 in which said hydroxyl amine is triethanolamine.

12. A method as claimed by claim 1 in which said hydroxyl amine is monoethanolamine.

13. A method as claimed by claim 1 in which said hydroxyl amine is N,N, tetra 2 hydroxy propyl ethylene diamine.

14. A method as claimed by claim 1 in which said hydroxyl amine is N,N, tetra ethanol ethylene diamine.

(References on following page)

References Cited

UNITED STATES PATENTS

| | | | |
|---|---|---|---|
| 2,347,178 | 4/1944 | Fritz et al. | 252—358 X |
| 2,854,417 | 9/1958 | Edwards et al. | 252—358 |
| 2,878,191 | 3/1959 | Montgomery | 260—501.17 |
| 3,013,997 | 12/1961 | Coler et al. | 260—501.17 |
| 3,325,523 | 6/1967 | Albert | 260—501.17 |
| 3,397,956 | 8/1968 | Buchanan et al. | 23—165 |

OSCAR R. VERTIZ, *Primary Examiner.*

ARTHUR GREIF, *Assistant Examiner.*

U.S. Cl. X.R.

252—358